United States Patent [19]

Lutterbach et al.

[11] Patent Number: 4,717,402
[45] Date of Patent: Jan. 5, 1988

[54] AIR PURIFICATION SYSTEM

[75] Inventors: Rickey S. Lutterbach; Ronald W. Marsh, both of Michigan City, Ind.

[73] Assignee: Control Resource Systems, Inc., Michigan City, Ind.

[21] Appl. No.: 656,708

[22] Filed: Oct. 1, 1984

[51] Int. Cl.⁴ .............................................. B01D 46/10
[52] U.S. Cl. ........................................ 55/269; 55/318; 55/467; 55/483; 55/500; 98/33.1; 237/53; 237/55
[58] Field of Search ................. 55/269, 318, 467, 468, 55/482–484, 486, 495, 267, 479, 480, 481, 312, 309, 140; 98/33 A; 126/110 R; 165/DIG. 2; 237/50, 53, 55

[56] References Cited

U.S. PATENT DOCUMENTS

| | | | |
|---|---|---|---|
| 2,481,861 | 9/1949 | Mueller | 237/55 |
| 2,826,264 | 3/1958 | McIlvaine | 55/309 |
| 3,326,198 | 6/1967 | Jackson et al. | 55/309 |
| 3,775,949 | 12/1973 | Wachter | 55/312 |
| 4,012,191 | 3/1977 | Lisankie et al. | 237/55 X |
| 4,082,525 | 4/1978 | Allan | 55/355 |
| 4,175,934 | 11/1979 | Lang et al. | 55/467 X |
| 4,268,282 | 5/1981 | Mackenzie | 55/484 X |
| 4,319,453 | 3/1982 | Mann | 55/267 X |
| 4,401,261 | 8/1983 | Brown | 237/55 |
| 4,477,019 | 10/1984 | Breitbach | 237/55 X |
| 4,509,681 | 4/1985 | Kogut | 237/53 |

OTHER PUBLICATIONS

American Air Filter, "Astrocel", CADI-110-E, 7/84.

Primary Examiner—Charles Hart
Attorney, Agent, or Firm—Wood, Dalton, Phillips, Mason & Rowe

[57] ABSTRACT

An air purification system for use with an air conditioning apparatus which includes an air circulation system having supply air flow to a given area and return air flow for drawing air from that area. The air purification system includes an inlet and an outlet. A conduit communicates the inlet with the air circulation system for drawing therefrom a portion of the air passing therethrough. A conduit communicates the outlet with the air circulation system downstream of the inlet for returning the portion of the air back to the circulation system after it has passed through the air purification unit. A superheating conduit also communicates between the inlet and an exhaust of the air conditioning apparatus, such as the chimney of a furnace.

20 Claims, 3 Drawing Figures

AIR PURIFICATION SYSTEM

BACKGROUND OF THE INVENTION

This invention relates generally to an air purification system for use with an air conditioning apparatus which may be either a heating or cooling apparatus having supply conduit means for supplying conditioned air to a given area and return conduit means for drawing air from the area back to the apparatus.

The invention will be described herein in relation to a heating apparatus which includes a furnace or the like and an air circulation system including supply conduit means and return conduit means. However, it should be understood that the air purification system of this invention is equally applicable for use with air cooling apparatus.

Heretofore, air purification systems such as those employed in an ordinary home, have utilized filters which are placed directly in the circulation system of the installation. For instance, a filter may be placed in the return conduit of air below a furnace or upstream of a cooling unit. One of the problems with such systems is that the filter itself reduces the flow of air through the circulation system of the heating or cooling apparatus. The more effective the filter, the greater will be the residue on and in the filter and, consequently, the conditioning apparatus itself inherently becomes less efficient.

In addition, by placing filter units in-line with the circulation system of an air conditioning apparatus, the filter is constantly operative. There may be instances where the air need not be filtered at a particular time or, for some reason, it is desirable to eliminate the filtering operation. This can be done only by completely removing the filter unit from its in-line location.

There is a need for, and the present invention is directed to, providing an air purification system which is a self-contained unit independent of the air conditioning (heating or cooling) apparatus itself. The air purification system employs a high volume, high efficiency means which draws only a portion of the air from the circulation system of the heating or cooling apparatus.

SUMMARY OF THE INVENTION

An object, therefore, of the invention is to provide a new and improved air purification system for use with standard air conditioning apparatus, such as heating or cooling installations.

Another object of the invention is to provide an air purification system for use with an air conditioning apparatus which includes a conditioning unit and an air circulation system including supply conduit means for supplying conditioned air to a given area and return conduit means for drawing air back from that area.

A further object of the invention is to provide an air purification system which also is capable of drawing air from the exhaust means of the conditioning apparatus, such as a heating unit, for superheating a portion of the air passing through the air purification system.

In the exemplary embodiment of the invention, the air purification means comprises a self-contained unit separate from the heating or cooling conditioning apparatus. Housing means is provided with an inlet and an outlet, filter means between the inlet and the outlet, and blower means for drawing air in through the inlet, through the filter means, and out through the outlet. Means communicates the inlet with the air circulation system, such as the return conduit means thereof, for drawing therefrom a portion of the air passing therethrough. Means communicates the outlet with the air circulation system, such as the return conduit means, downstream of the inlet communicating means for returning the portion of the air back to the circulation system after it has passed through the air purification means.

Therefore, it can be seen that the air purification system does not in any way reduce the efficiency of the conditioning apparatus whether it be a heating unit or a cooling unit. All of the air which is drawn from the air circulation system is returned thereto, and separate blower means is provided independent of that of the conditioning apparatus.

Another feature of the invention is the provision of means for superheating air when the air purification system is used with a heating installation. More particularly, a heating apparatus which employs a furnace, or the like, has a gas exhaust means, such as a chimney. The invention contemplates air conduit means passing through the exhaust means and into the inlet means of the air purification system. The conduit means may have a terminal end in communication with atmosphere for drawing fresh air through the exhaust means for superheating purposes, filtering the fresh air and introducing the superheated air into the circulation system of the heating apparatus.

Other objects, features and advantages of the invention will be apparent from the following detailed description taken in connection with the accompanying drawings.

DESCRIPTION OF THE DRAWINGS

The features of this invention which are believed to be novel are set forth with particularity in the appended claims. the invention, together with its objects and the advantages thereof, may be best understood by reference to the following description taken in conjunction with the accompanying drawings, in which like reference numerals identify like elements in the figures and in which:

DETAILED DESCRIPTION OF THE PREFERRED EMBODIMENT

Figure 1:
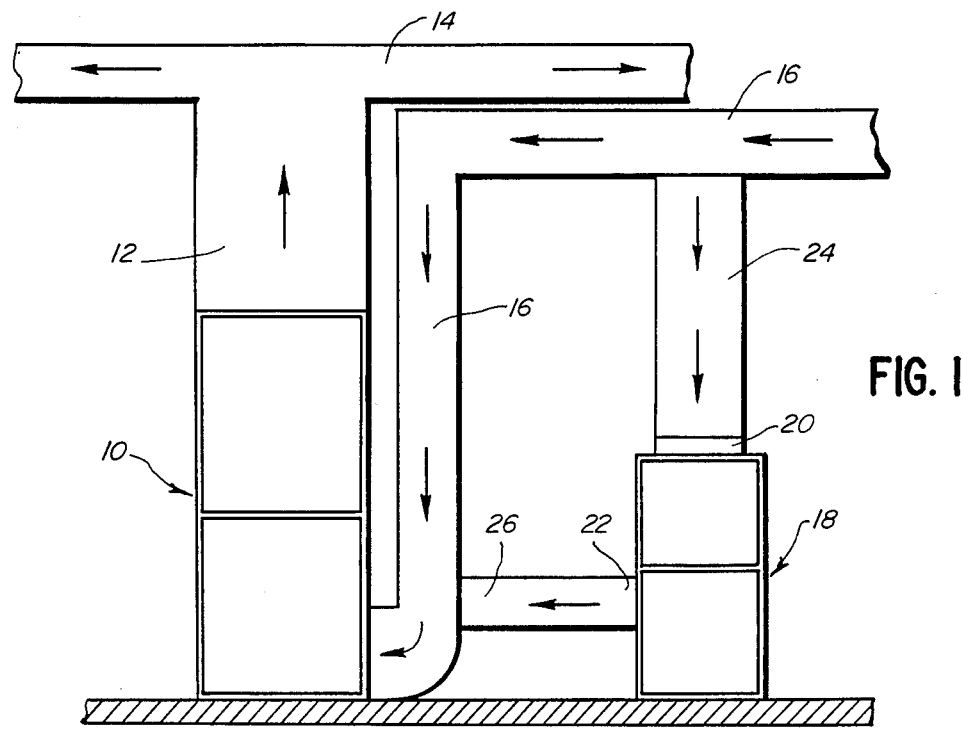
FIG. 1 is a somewhat schematic view of the air purification system of the invention in use with an air conditioning installation.

Turning to the drawings in greater detail, and first to FIG. 1, the air purification system of the invention is schematically illustrated for use with an air conditioning apparatus. It should be understood that the conditioning apparatus can include either a heating unit or a cooling unit. For purposes of illustration, a heating apparatus is shown to include a furnace, generally designated 10, and an air circulation system for supplying heated air to a given area and for drawing air from that area. The area may be a home or office, any room or portion thereof, or in conjunction with similar facilities. The air circulation system includes a plenum 12 above furnace 10, leading to supply conduit means 14 for supplying heated air to the given area. The air circulation system also includes return conduit means 16 for drawing air from the given area to the lower portion of furnace 10.

The air purification system of the invention includes air purification means, generally designated 18. The details and components of the air purification means will be described in relation to FIG. 3. However, air purification means 18 includes inlet means 20 and outlet means 22.

Conduit means 24 communicates between inlet means 20 and return conduit means 16 of the air circulation system for drawing therefrom a portion of the air passing therethrough. Conduit means 26 communicates between outlet means 22 and return conduit means 16 of the air circulation system, downstream of inlet conduit means 24, for returning the portion of the air drawn from the circulation system after it has passed through air purification means 18.

From the foregoing, it can be seen that the air purification system of the invention can withdraw and return downstream an equal amount of air without in any way interfering with the efficiency of the air conditioning apparatus, such as furnace 10. There is no purification means, such as a filter, directly in the air circulation system of the conditioning apparatus. In addition, it can be seen from FIG. 1 that the air purification system of the invention is readily applicable for after-installation in already installed and operative heating or cooling installations. Furthermore, operation of air purification means 18 can be connected directly with the motor means of furnace 10 so that it is turned on and off in unison with the main air conditioning apparatus.

Figure 2:
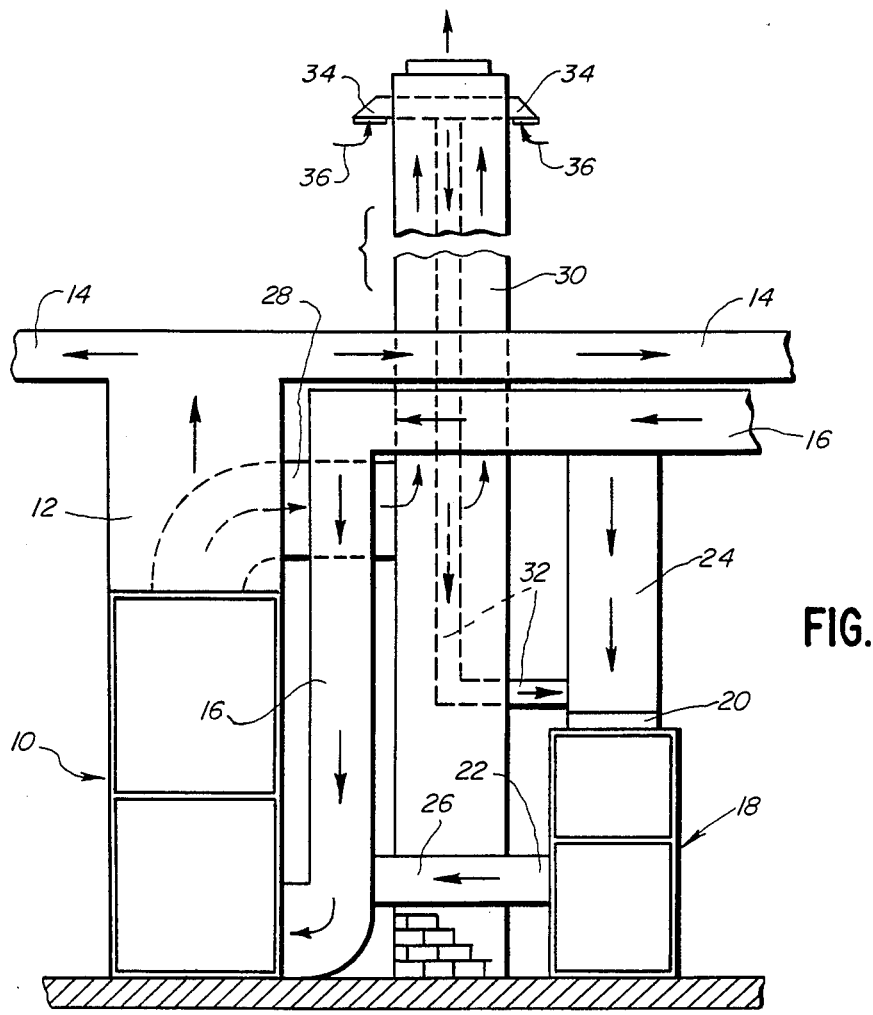
FIG. 2 is a view similar to that of FIG. 1, illustrating the system of the invention to include means for superheating air therethrough.

FIG. 2 shows the air purification system of this invention installed similarly as in FIG. 1, described above, but including an air superheating feature. Like numerals have been applied to FIG. 2 for indicating like components described in relation to FIG. 1.

In FIG. 2, furnace 10 is shown to include gas exhaust conduit 28 leading to a standard chimney 30 or other exhaust means. An air conduit 32 communicates with inlet conduit 24 of air purification means 18. Conduit 32 runs upwardly through chimney 30 and has terminal wing portions 34 passing through the walls of chimney 30 at the upper end thereof so that fresh air can be drawn into conduit 32 from atmosphere, as indicated by arrows 36.

Therefore, when air purification means 18 is actuated, not only is a portion of the air passing through return conduit means 16 drawn into the air purification means, but a certain amount of fresh air is drawn through conduit 32 into the air purification means. Normally, the majority of the air drawn into the air purification means is from return conduit 16. As the fresh air is drawn downwardly through chimney 30, it is heated considerably by the exhaust gases from furnace 10. The heated air is mixed with the return air and introduced into the circulation system for superheating purposes. This will enhance the efficiency of the entire heating installation.

Figure 3:
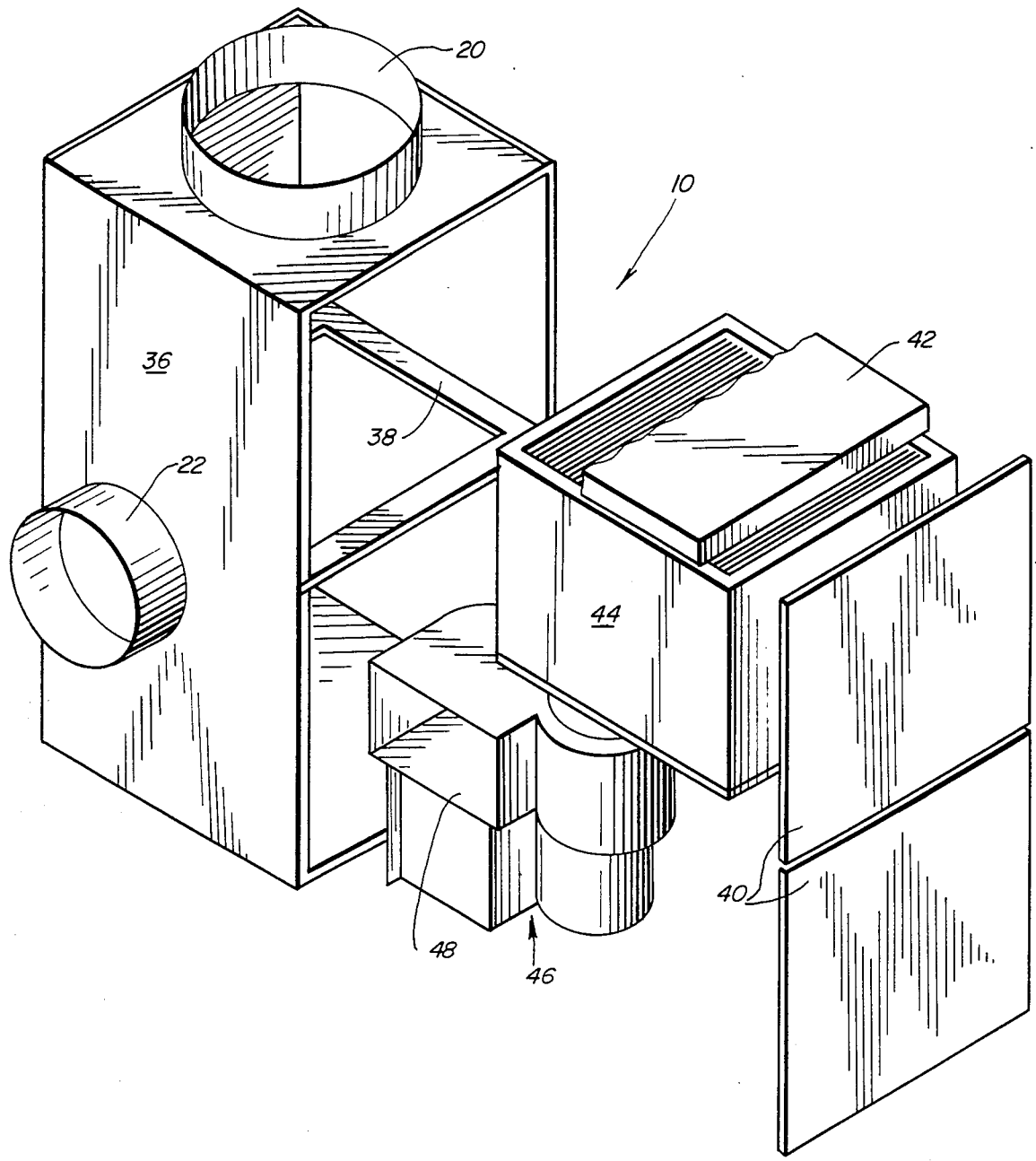
FIG. 3 is an exploded perspective view, on an enlarged scale, of the air purification means of the invention.

FIG. 3 illustrates the components of air purification means 10. A housing 36 has inlet 20 disposed at the top thereof and outlet 22 in one side thereof, similar to that shown in FIGS. 1 and 2. The housing has an interior filter support frame 38, and a pair of access doors 40 for closing the front of the housing. A pre-filter 42 and a main filter 44 are disposed within housing 36 above frame 38. A motor and blower unit, generally designated 46 is disposed in the lower portion of housing 36.

An outlet 48 of the blower unit communicates with outlet 22 of the housing. Therefore, air is drawn in through inlet 20, through pre-filter 42 and main filter 44, through blower 46 and out through outlet 22.

Main filter 44 is a HEPA type filter medium, HEPA being the acronym for High Efficiency Particulate Air-filter. This type of filter was developed by the U.S. Army Chemical Corps and is a glass membrane having intimately distributed pores capable of filtering from the air passing therethrough extremely large volumes of particles submicron in size, thus thoroughly cleansing the air. This type of filter is so fine that in the highest efficiency models it is 99.97% efficient with particles down to 0.3 microns and is known in the industry and the medical profession as the "absolute" filter.

Pre-filter 42 is designed to remove larger particles from the air in order to prevent the main filter from prematurely clogging. Of course, the pre-filter is much less expensive and can be replaced quite often.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

What is claimed is:

1. An air purification system for use in combination with an air conditioning apparatus which includes an air circulation system having supply conduit means for supplying heated air to a given area and return conduit means for drawing air from said area, the air purification system comprising:
   air purification means including inlet means and outlet means, filter means between said inlet means and said outlet means, and blower means independent of said air conditioning apparatus for drawing air in through said inlet means, through said filter means and out through said outlet means;
   means connecting said inlet means with said air circulation system for drawing therefrom, by said blower means, only a portion of the air passing therethrough; and
   means connecting said outlet means with said air circulating system downstream of the inlet communicating means for returning said portion of the air back to the circulation system after it has passed through said air purification means.

2. The air purification system of claim 1 wherein said inlet communicating means is in communication with said return conduit means.

3. The air purification system of claims 1 or 2 wherein said outlet communicating means is in communication with said return conduit means.

4. The air purification system of claims 1 or 2 wherein said air purification means comprises a self-contained unit separate from said air conditioning apparatus, with housing means for said filter means and blower means, said inlet means and oulet means being through said housing means.

5. The air purification system of claims 1 or 2 wherein said filter means comprises a HEPA type filter.

6. The air purification system of claim 1 wherein air conditioning apparatus includes a heating unit said having gas exhaust means, and including air conduit means passing through said exhaust means and into said inlet means for superheating a portion of the air passing through said air purification means and introducing the superheated air into said air circulation system.

7. The air purification system of claim 6 wherein said air conduit means is in communication with said inlet communicating means.

8. The air purification system of claim 6 wherein a terminal end of said air conduit means is in communication with atmosphere for drawing fresh air through said exhaust means for superheating purposes.

9. An air purification system for use in combination with an air conditioning apparatus which includes an air circulation system having supply conduit means for supplying conditioned air from the conditioning apparatus to a given area and return conduit means for drawing air from said area to the conditioning apparatus, the air purification system comprising:

air purification means including inlet means, outlet means, filter means between said inlet means and said outlet means, and blower means for drawing air in through said inlet means, through said filter means, and out through said outlet means;

conduit means connected between said inlet means and said return conduit means of said air circulation system for drawing therefrom only a portion of the air passing therethrough; and conduit means connected between said outlet means and the return conduit means of said air circulation system downstream of the inlet conduit means for returning said portion of the air back to the circulation system after it has passed through said air purification system.

10. The air purification system of claim 9 wherein said air purification means comprises a self-contained unit separate from said air conditioning apparatus, with housing means for said filter means and blower means, said inlet means and outlet means being through said housing means.

11. The air purification system of claim 9 wherein said filter means comprises a HEPA type filter.

12. The air purification system of claim 9 wherein said air conditioning apparatus includes a heating unit having gas exhaust means, and including air conduit means passing through said exhaust means and into said inlet means for superheating a portion of the air passing through said air purification means and introducing the superheated air into said circulation system.

13. The air purification system of claim 12 wherein said air conduit means is in communication with said inlet communicating means.

14. The air purification system of claim 13 wherein a terminal end of said air conduit means is in communication with atmosphere for drawing fresh air through said exhaust means for superheating purposes.

15. An air purification system for use in combination with a heating apparatus which includes gas exhaust means from the heating apparatus, and an air circulation system including supply conduit means for supplying heated air from the heating apparatus to a given area and return conduit means for drawing air from said area to the heating apparatus, the air purification system comprising:

air purification means including inlet means and an outlet, filter means between said inlet and said outlet, and blower means independent of said heating apparatus for drawing air in through said inlet, through said filter means and out through said outlet;

means connecting said inlet with said air circulation system for drawing therefrom, by said blower means, only a portion of the air passing therethrough;

means connecting said inlet with said exhaust means to superheat a portion of the air passing through said air purification means; and means connecting said outlet with said air circulation system downstream of said inlet communication means for returning said portion of the air and said superheated air to the circulation system after it has passed through said air purification means.

16. The air purification system of claim 15 wherein said inlet communicating means is in communication with said return conduit means.

17. The air purification system of claims 15 or 16 wherein said outlet communicating means is in communication with said return conduit means.

18. The air purification system of claims 15 or 16 wherein said air purification means comprises a self-contained unit separate from said heating apparatus, with housing means for said filter means and blower means, said inlet means and outlet means being through said housing means.

19. The air purification system of claims 15 or 16 wherein said filter means comprises a HEPA type filter.

20. The air purification system of claim 15 wherein a terminal end of said air conduit means is in communication with atmosphere for drawing fresh air through said exhaust means for superheating purposes.

* * * * *